United States Patent
Mathea

(10) Patent No.: US 12,042,982 B2
(45) Date of Patent: Jul. 23, 2024

(54) METHOD FOR PRODUCING A THREE-DIMENSIONAL SHAPED OBJECT BY MEANS OF LAYER-BY-LAYER MATERIAL APPLICATION

(71) Applicant: dp polar GmbH, Eggenstein-Leopoldshafen (DE)

(72) Inventor: Hans Mathea, Eggenstein-Leopoldshafen (DE)

(73) Assignee: 3D Systems GmbH, Morfelden-Walldorf (DE)

(*) Notice: Subject to any disclaimer, the term of this patent is extended or adjusted under 35 U.S.C. 154(b) by 360 days.

(21) Appl. No.: 17/267,054

(22) PCT Filed: Aug. 12, 2019

(86) PCT No.: PCT/EP2019/071610
§ 371 (c)(1),
(2) Date: Feb. 9, 2021

(87) PCT Pub. No.: WO2020/035456
PCT Pub. Date: Feb. 20, 2020

(65) Prior Publication Data
US 2021/0299944 A1   Sep. 30, 2021

(30) Foreign Application Priority Data
Aug. 15, 2018   (DE) ............... 10 2018 006 397.7

(51) Int. Cl.
*B29C 64/112*   (2017.01)
*B29C 64/188*   (2017.01)
(Continued)

(52) U.S. Cl.
CPC .......... *B29C 64/112* (2017.08); *B29C 64/188* (2017.08); *B29C 64/209* (2017.08);
(Continued)

(58) Field of Classification Search
CPC ... B29C 64/112; B29C 64/188; B29C 64/209; B29C 64/214; B29C 64/268;
(Continued)

(56) References Cited

U.S. PATENT DOCUMENTS 9,849,631 B1   12/2017   Goss et al.
2013/0011562 A1   1/2013   Varanka et al.
(Continued)

FOREIGN PATENT DOCUMENTS

DE   102015212569 A1   1/2017
DE   102016122131 A1   5/2018
(Continued)

*Primary Examiner* — Michael M. Robinson
(74) *Attorney, Agent, or Firm* — The Webb Law Firm

(57) ABSTRACT

In a method for producing a three-dimensional mold and a three-dimensional shaped object (1) by means of layer-by-layer material application, geometry data for the shaped object (1), a support part (2) having a base surface (3) for holding the three-dimensional shaped object (1), and a first and a second material (4, 5) that can be solidified are made available. In the solidified state, the second material (5) has a greater strength than the solidified first material (4). The solidified first material (4) can dissolve in the solvent. To form a negative-shape layer (12), material portions of the flowable first material (4) are applied to the base surface (3) and/or to a solidified material layer of the three-dimensional shaped object (1) situated on this surface, in accordance with the geometry data, in such a manner that the negative-shape layer (12) has at least one cavity (13) that has a negative shape of a material layer of the shaped object (1) to be produced. The negative-shape layer (12) is solidified. To form a shaped-object layer (16), the cavity (13) is filled with the second material (5), and afterward the second material (5) is solidified. Regions of the solidified negative-shape layer (12) and/or shaped-object layer (16) that project beyond a plane arranged at a predetermined distance from (Continued)

the base surface (3) are removed by means of machining material removal. The steps mentioned above are repeated at least once. The negative-shape layers (12) are brought into contact with the solvent in such a manner that the solidified first material (4) dissolves in a solvent.

16 Claims, 20 Drawing Sheets

(51) Int. Cl.
| | |
|---|---|
| *B29C 64/209* | (2017.01) |
| *B29C 64/214* | (2017.01) |
| *B29C 64/268* | (2017.01) |
| *B29C 64/314* | (2017.01) |
| *B29C 64/336* | (2017.01) |
| *B29C 64/343* | (2017.01) |
| *B29K 101/12* | (2006.01) |
| *B29K 105/00* | (2006.01) |
| *B33Y 10/00* | (2015.01) |
| *B33Y 40/20* | (2020.01) |
| *B33Y 70/00* | (2020.01) |

(52) U.S. Cl.
CPC .......... *B29C 64/214* (2017.08); *B29C 64/268* (2017.08); *B29C 64/314* (2017.08); *B29C 64/336* (2017.08); *B29C 64/343* (2017.08); *B33Y 10/00* (2014.12); *B33Y 40/20* (2020.01); *B33Y 70/00* (2014.12); *B29K 2101/12* (2013.01); *B29K 2105/007* (2013.01); *B29K 2105/0094* (2013.01)

(58) Field of Classification Search
CPC ... B29C 64/314; B29C 64/336; B29C 64/343; B33Y 10/00; B33Y 40/20; B33Y 70/00; B29K 2105/009
See application file for complete search history.

(56) References Cited

U.S. PATENT DOCUMENTS

| | | |
|---|---|---|
| 2013/0295338 A1 | 11/2013 | Keating et al. |
| 2016/0355694 A1 | 12/2016 | Okamoto |
| 2019/0105852 A1* | 4/2019 | Hoyle .................... B29C 70/06 |
| 2019/0322039 A1 | 10/2019 | Bursch et al. |

FOREIGN PATENT DOCUMENTS

| | | |
|---|---|---|
| EP | 0463981 A2 | 1/1992 |
| JP | H8281809 A | 10/1996 |
| JP | 200311237 A | 1/2003 |
| JP | 201589943 A | 5/2015 |
| JP | 2015128884 A | 7/2015 |
| RU | 2160288 C2 | 12/2000 |
| WO | 2015092017 A1 | 6/2015 |
| WO | 2015105047 A1 | 7/2015 |
| WO | 2016011252 A1 | 1/2016 |
| WO | 2017064073 A1 | 4/2017 |

* cited by examiner

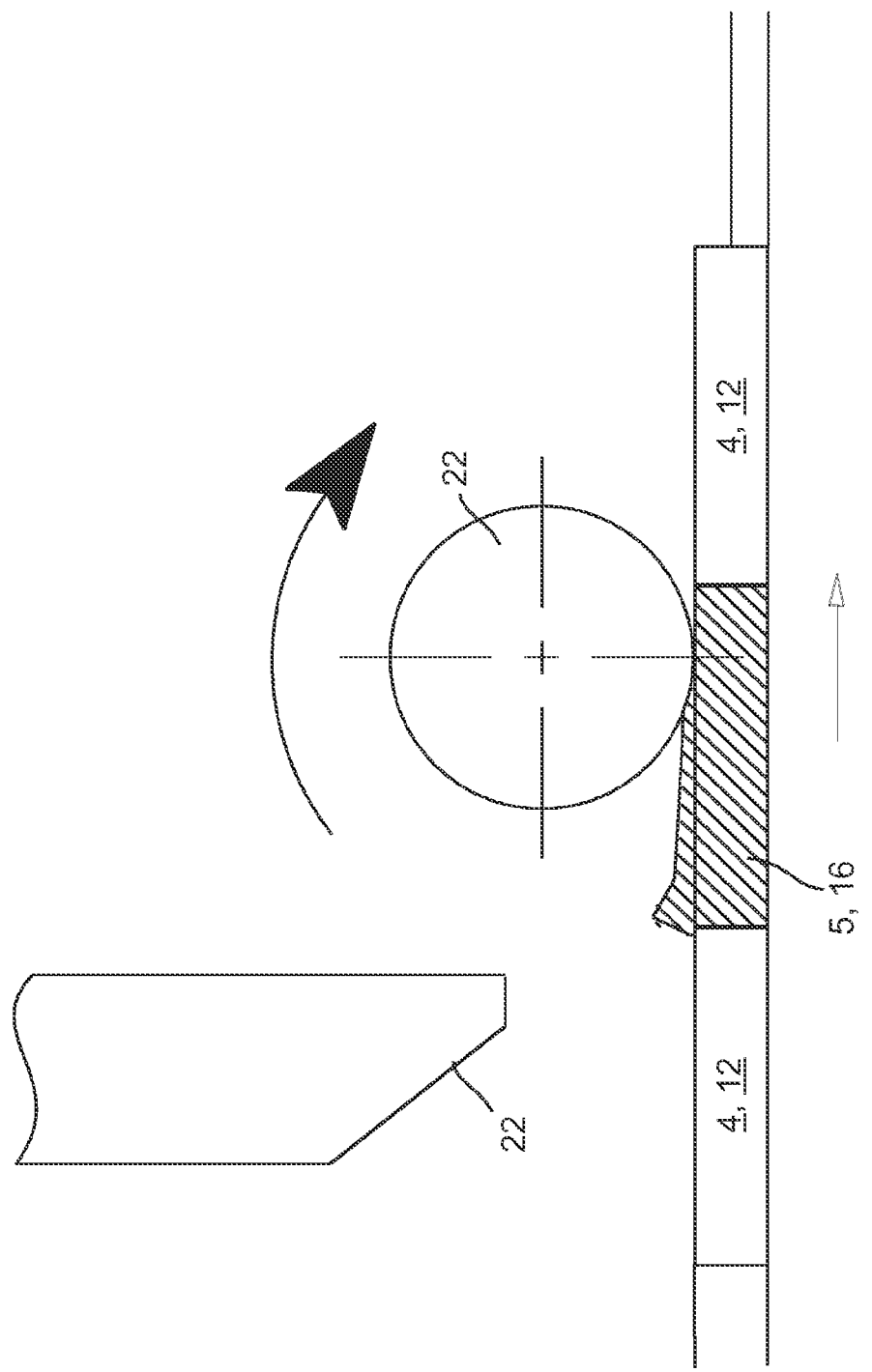

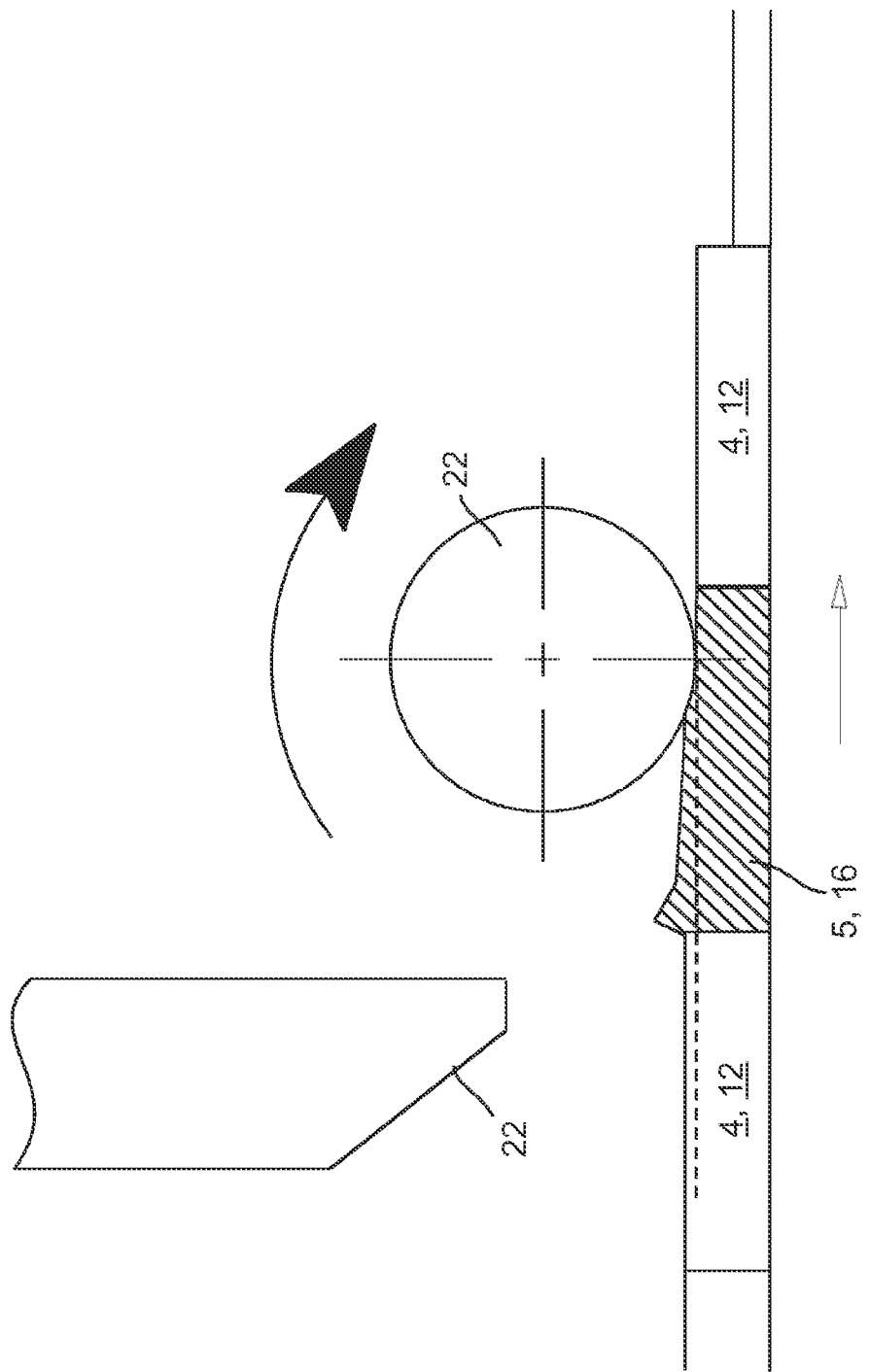

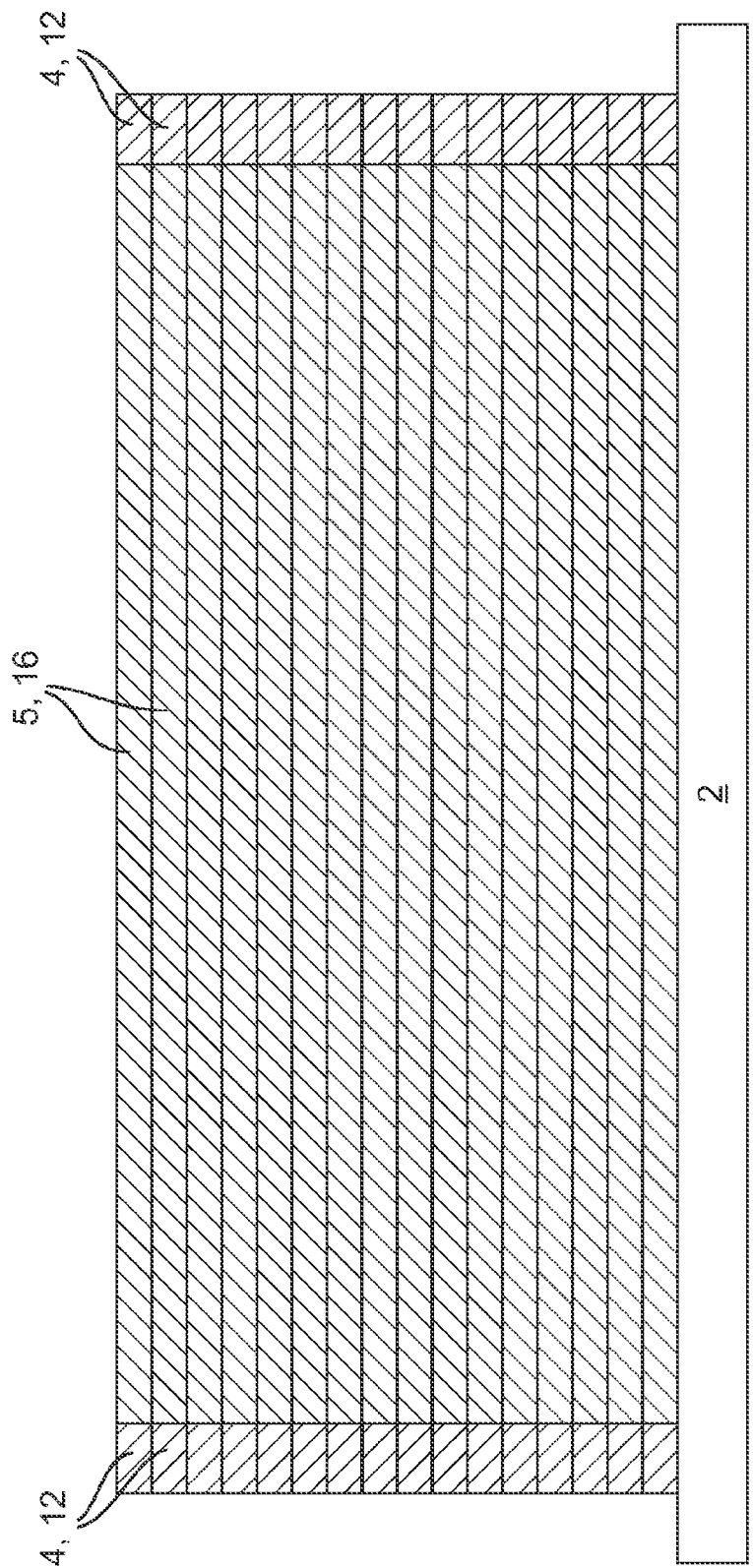

METHOD FOR PRODUCING A THREE-DIMENSIONAL SHAPED OBJECT BY MEANS OF LAYER-BY-LAYER MATERIAL APPLICATION

CROSS-REFERENCE TO RELATED APPLICATIONS

This application is the United States national phase of International Application No. PCT/EP2019/071610 filed Aug. 12, 2019, and claims priority to German Patent Application No. 10 2018 006 397.7 filed Aug. 15, 2018, the disclosures of which are hereby incorporated by reference in their entirety.

BACKGROUND OF THE INVENTION

Field of the Invention

The invention relates to a method for producing a three-dimensional shaped object by means of layer-by-layer material application, wherein geometry data for the shaped object, a support part having a base surface for holding the three-dimensional shaped object, a liquid or flowable first material that can solidify, a liquid, flowable, paste-like or powder-form second material that can solidify, and a solvent in which the solidified first material can be dissolved are made available.

Description of Related Art

In the case of such a method, known from practice, liquid polymers are used as the first and the second material, which polymers can be solidified under the effect of ultraviolet radiation. In the case of the previously known method, first a first material layer is applied to the base surface of the support part, in that droplet-shaped material portions of the first and the second material are sprayed onto different locations of the base surface using an inkjet printer. The locations at which the material droplets composed of the different materials are applied to the base surface are selected as a function of geometry data made available for the shaped object to be produced, in such a manner that the regions of the material layer that consist of the second material form a lowermost layer of the shaped object to be produced. The first material serves as a support material that is applied to the base surface at locations where no second material is applied, and above which the shaped object has overhangs after application of a further material layer of the first material, which overhangs are supposed to be supported by the support material until solidification of all the material layers. The lowermost material layer obtained in this manner is irradiated with ultraviolet radiation in a further step, so as to solidify polymers contained in the first and in the second material by means of cross-linking.

After the lowermost material layer has been completed, further material layers are applied to it in corresponding manner and solidified, until all the layers of the shaped object have been produced and solidified. Afterward, the layer stack obtained in this manner is brought into contact with the solvent until the first material has dissolved in it. The second material is not soluble in the solvent.

The previously known method does make it possible to produce three-dimensional shaped objects as prototypes or in small numbers, in comparatively cost-advantageous manner. Good surface quality is achieved by means of the use of polymers that can be cross-linked using UV light, and due to the high resolution when printing. However, a very low viscosity of the polymers is required for high-resolution 3D printing, so that these can be applied to the base surface or to a solidified material layer situated on it through fine jets.

In the inkjet printing method (InkJet method), the jets can usually process a maximum viscosity of 25 mPa·s. Higher viscosities generally cannot be dispensed through jets. The objects produced from such materials are only able to withstand minimal stresses and can only serve as a display object.

From practice, it is also already known to produce an injection-molding mold for an injection-molding machine from a liquid polymer that can be solidified, by means of layer-by-layer material application using an inkjet 3D printer. The injection-molding mold has two mold parts, between which a cavity is formed, which has a three-dimensional negative shape of a shaped object to be produced in the injection-molding machine. The injection-molding mold is produced in the 3D printer by means of application of a plurality of layers of the polymer, which is applied in liquid form to a base surface or to a solidified material layer previously applied to this surface, using jets. After application of each material layer, the polymer, which is still liquid, is irradiated with UV light, in each instance, so as to cross-link it and thereby to solidify the material layer in question. Then further material layers are applied and solidified in corresponding manner, until the injection-molding mold has been completed. Subsequently, the injection-molding mold is removed from the 3D printer and installed in the injection-molding machine, and a hot plastic that differs from the polymer is injected into the cavity through the injection openings provided in the injection-molding mold. After the cavity has been filled with the plastic and the plastic has cooled, the injection-molding mold is opened and the shaped object is ejected from the cavity using ejectors. The method has the disadvantage that molds produced using 3D printing have only a very limited useful lifetime due to the high temperature of the material filled into them, and must be replaced after approximately 10 to 100 injection-molding processes. Furthermore, installation of the injection-molding mold into the injection-molding machine is relatively time-consuming. This is particularly disadvantageous in the case of individual production of a shaped object.

In the case of other known technologies that use solids as a construction material, thermoplastics are generally melted and applied layer by layer through a jet or in the form of a powder, using the sintering method. The relatively good ability to withstand stress, however, is achieved at the cost of the printing time (very slow) or low resolution and/or surface quality.

The stereolithography method, with which higher viscosities can also be processed, offers a slight advantage. This advantage results from the fact that the materials do not have to be sprayed through a jet, but rather are cross-linked using an external UV beam, after being provided in a polymer container. So-called two-component UV polymers having even further improved properties can also be processed in this way. As a result, better ability of the shaped objects to withstand stress is also achieved. The disadvantages, however, are: large amounts of material for production of an object, limited curing time of the two-component mixture, great material consumption (does not allow re-use of the polymers not used up). All this clearly increases the costs of parts production.

Other than the inkjet method, all known 3D technologies have yet another serious defect: they are not multi-materialcapable. This means that only one material type can be used at a time. As a result, usability of the method in industry is very limited.

SUMMARY OF THE INVENTION

It is therefore the task of the invention to indicate a method of the type stated initially, with which mechanically stable three-dimensional shaped objects that are able to withstand stress can be printed at high resolution.

This task is accomplished with the characteristics of claim 1. According to the invention, a method for producing a three-dimensional shaped object by means of layer-by-layer material application is provided, in which geometry data for the shaped object, a support part having a base surface for holding the three-dimensional shaped object, a liquid or flowable first material that can solidify, a liquid, flowable, paste-like or powder-form second material that can solidify, and a solvent are made available, wherein the second material, in the solidified state, has a greater strength than the solidified first material, wherein the solidified first material can be dissolved in the solvent, a) wherein for the formation of a negative-shape layer, material portions of the flowable first material are applied to the base surface and/or to a solidified layer of the three-dimensional shaped object situated on this surface, in accordance with the geometry data, in such a manner that the negative-shape layer has at least one cavity on its surface facing away from the base surface, which cavity has a negative shape of a material layer of the shaped object to be produced, b) wherein the negative-shape layer is solidified, c) wherein for the formation of a shaped-object layer, the cavity is filled with the second material in such a manner that the negative shape is transferred to the shaped-object layer as a positive shape, d) wherein the second material filled into the cavity is solidified, e) wherein regions of the solidified negative-shape layer and/or of the solidified shaped-object layer projecting beyond a plane arranged at a predetermined distance from the base surface are removed by means of machining material removal, f) wherein steps a) to e) are repeated at least once, g) wherein the negative-shape layers are brought into contact with the solvent in such a manner that the solidified first material dissolves in the solvent.

According to the invention, a hybrid method is therefore provided, in which materials having different properties are processed by means of different printing methods and/or are applied, layer by layer, to the base surface or to a solidified material layer of the three-dimensional shaped object situated on this surface, by means of different printing apparatuses. This can take place in a continuous 3D printing process, i.e. the method can be carried out completely in a 3D printing station. No further production process outside of the 3D printing station is required.

The first material can have a very low viscosity or be inviscid or highly flowable, because it merely serves for producing a mold for the second material. Because of the low viscosity or the great flowability that the first material demonstrates during application onto the base surface or onto a material layer of the three-dimensional shaped object, the mold can be printed by means of a digital printing method, with high resolution and good surface quality, in that a plurality of correspondingly small material portions of the first material is applied to the base surface or to the solidified material layer of the three-dimensional shaped object situated on this surface.

Only low demands are made regarding the mechanical stability and strength of the material layer of the mold consisting of the first material, since the mold merely needs to carry the second material and to support possible forces that act on the first material during the printing process provided for application of the second material. By means of the solidification of the first material, this material achieves sufficient strength so that it can act as a shaper for the second material. The mechanical strength of the first material in the solidified state has no influence on the mechanical stability of the shaped object formed from the solidified layers of the second material, because the first solidified material is removed from the shaped object after application of all the material layers, by being dissolved in the solvent. The solidified second material is not soluble in the solvent.

The second material is the actual construction material for the shaped object and can have properties different from the first material, above all greater viscosity. Since the second material is geometrically shaped by being molded in the mold produced from the first material, it is not necessary to apply small material portions of the second material to the base surface or to the solidified material layer of the three-dimensional shaped object situated on this surface in order to achieve high print resolution. Instead, it is also possible to work with a highly viscous second material. As a result, great mechanical stability and strength of the shaped object can be achieved. If necessary, it is even possible that the second material contains a mixture of at least two different highly viscous substances and/or at least one additive for increasing the material strength. The second material can also be applied selectively to the base surface or to the solidified material layer of the three-dimensional shaped object situated on this surface, using a digital printing process, in other words by means of applying a plurality of material portions to different locations, which are selected in accordance with the geometry data made available for the shaped object. However, it is also possible to apply the second material to the base surface or to the solidified material layer of the three-dimensional shaped object situated on this surface, using an analog printing process. In this regard, it is even possible to apply two or more components of the second material to the base surface and/or to a solidified material layer situated on this surface, so as to produce a shaped object that contains multiple different components. This type of multi-material capability can be achieved by means of placing multiple printing modules for the second material in line, one behind the other. In this way, different mechanical and/or electrical properties and/or different colors can be achieved.

Because of the fact that in the case of the method according to the invention, preferably after printing of each individual material layer, regions of the solidified negative-shape layer and/or of the solidified shaped-object layer that project, in each instance, beyond a plane that is arranged above the base surface at a predetermined distance from it, preferably parallel to it, are removed by means of machining material removal, the individual layers of the shaped object run precisely parallel to and are arranged in a predetermined arrangement relative to one another, and have a predetermined layer thickness. Furthermore, "contaminants" that can occur on the surface of the uppermost layer of the first material when the cavities are filled with the second material when the second material makes contact with this surface are removed. Removal of the regions projecting beyond the plane therefore ensures that the mixed layer consisting of the solidified first and second material always has the desired thickness, and that it is free of the second material, which is insoluble in the solvent, at the surface of the first material. This allows very precise and low-distortion production of the shaped object. The machining material removal preferably takes place by means of what is called a thickness-milling tool/polishing tool. Preferably, step e) of claim 1 is carried out, in each instance, after application of each individual material layer of the first material. The regions of the solidified negative-shape layer and/or of the solidified shaped-object layer that project beyond the plane arranged at the predetermined distance from the base surface are preferably removed completely. Thereby, after removal of the projecting regions, both the uppermost negative-shape layer and the uppermost shaped-object layer each end flush with the plane arranged at the predetermined distance from the base surface.

In the case of the method according to the invention, the regions of the solidified negative-shape layer and of the solidified shaped-object layer that project beyond the plane arranged at the predetermined distance from the base surface, preferably parallel to it, are removed after each application of a shaped-object layer, by means of machining material removal. Using the method according to the invention, it is therefore possible to produce shaped objects completely in a printer, without another process being required.

In a preferred embodiment of the invention, the material portions of the first material are preferably applied to the base surface and/or to the solidified negative-shape layer and/or to a solidified shaped-object layer by means of an inkjet printing method or by means of electrophotography, wherein the first material is a material that can be solidified by means of the application of energy, to which the energy is applied so as to solidify the negative-shape layer. Preferably, the second material is also a material that can be solidified by means of the application of energy, to which material the energy is applied after it has been filled into the cavity. The energy can particularly comprise radiation, preferably optical radiation such as UV radiation.

In an advantageous embodiment of the method, the viscosity of the second material in the non-solidified state is greater, where applicable at least 10 times as great, particularly at least 200 times as great, and preferably at least 2000 times as great as the viscosity of the first material in the non-solidified state, and/or the flowable first material and the flowable, paste-like or powder-form second material have a solids proportion, wherein the solids proportion of the second material, in the non-solidified state of this material, is greater, where applicable at least 10 times as great, particularly at least 200 times as great, and preferably at least 2000 times as great as the solids proportion of the first material in its non-solidified state. This allows the production of a shaped object that demonstrates high surface quality and great surface precision, and, at the same time, excellent mechanical strength. Furthermore, the second material can be made available with a solids proportion (additives) in spherical or fiber-like form, which clearly improve the mechanical and/or electrical properties as compared with a corresponding material without solids proportions.

In a practical embodiment of the invention, the first material has a working viscosity suitable for jet application, which is less than 1000 mPa·s, particularly less than 100 mPa·s, where applicable less than 30 mPa·s, and preferably less than 10 mPa·s, and is applied to the base surface and/or to the solidified material layer of the three-dimensional shaped object situated on it in the form of droplets of liquid, at a resolution of at least 360 dpi, particularly at least 720 dpi and preferably at least 1440 dpi. This allows good surface quality of the shaped object. The second material is preferably heated as compared with room temperature, so as to change its flowability, preferably so as to increase it, i.e. to reduce its viscosity. Afterward, the second material, which has been heated to a working temperature, should be applied to the base surface or to a solidified material layer situated on it.

In a further development of the invention, the second material is applied to the negative-shape layer by means of a selective, digital coating/metering method, as a function of the geometry data, in such a manner that at least one material portion of the flowable, paste-like or powder-form second material is dispensed into the at least one cavity, and locations of the negative-shape layer, preferably situated outside of the cavity, are not brought into contact with the second material, or are only brought into contact slightly. The second material is thereby preferably dispensed only at the locations where cavities are present. Filling of the second material into the cavities can take place using jets that can be adjusted between an open position and a closed position by means of a valve or similar setting device. Synchronization of the valves as a function of the relative position between the cavities and the dispensing openings of the jets can take place by means of a controller. This is an advantage as compared with analog coating methods, in which the second material is applied over a large area, both within and outside of the cavities. The second material can have a property different from the first material when it is filled into the cavities; in particular, the second material can have a greater viscosity than the viscosity of the first material when it is applied to the base surface or to a solidified material layer of the three-dimensional shaped object situated on this surface.

In a preferred embodiment of the invention, the second material is a composite, which comprises a fluid and at least one additive, wherein the fluid, at room temperature, has a viscosity of at least 50 mPa·s and preferably of at least 1000 mPa·s, and wherein the additive has solid particles that are arranged in the fluid. The solid particles can comprise fibers, particularly carbon fibers, nano tubes, glass beads, graphene, styrene block copolymers, particularly styrene-ethylene-butylene-styrene (SEBS), nano/micro particles of solids as fillers and/or highly branched polyesterols and/or mixtures of them. The composite can be filled into the cavity/cavities at room temperature or heated to a temperature higher than room temperature.

In a preferred embodiment of the invention, the second material has a greater viscosity and/or a greater solids proportion than the first material, wherein both the first and the second material are applied to the base surface and/or to a solidified negative-shape layer and/or shaped-object layer situated on this surface by means of an inkjet printing method, wherein in the case of the inkjet printing method, the first material is ejected from at least one first jet and the second material is ejected from at least one second jet, and wherein the exit opening of the second jet has a greater cross-section and/or has a higher working pressure applied to it than the exit opening of the first jet, wherein particularly the diameter of the exit opening of the second jet is greater than that of the exit opening of the first jet. An inkjet printing method is understood to be a printing method in which the second material is ejected from the jet by means of a piezoelectric activator, in pulses and/or in portions (jetting). Because of the greater cross-section and/or higher working pressure of the second jet, inkjet printing of the highly viscous second material is made possible. The smaller cross-section of the exit opening of the first jet in comparison with the cross-section of the exit opening of the second jet and/or the higher working pressure of the second jet in comparison of the working pressure of the first jet makes it possible to apply the first material to the base surface or to a solidified material layer of the three-dimensional shaped object situated on this surface at high resolution.

The jets are placed at a small distance from the surface to which the second material is supposed to be applied. When a cavity is situated under the jet, the flow of the second material out of the material channel of the jet is activated. The second material is pressed out of the jet, and a strip of the second material is deposited onto the surface as it moves relative to the jet. After deactivation of the material replenishment, the jet moves over the surface without dispensing any material.

In a further development of the invention, a gas pressure is applied to the second material, and the second material, which has been put under pressure in this manner, is passed to at least one jet by way of at least one valve, wherein the exit opening of the jet is positioned relative to the support part along the base surface, and the valve is controlled to open and close as a function of the geometry data made available for the shaped object to be produced and as a function of the relative position between the jet and the support part, in such a manner that the material flow is released when the exit opening is positioned at the cavity, and the material flow is blocked when the exit opening is not positioned at the cavity. In this regard, the valve can be activated electromagnetically or by means of a piezo element.

Preferably, the exit opening of a jet is moved relative to the support part along a continuous line that runs within the cavity, and the liquid, flowable or paste-like second material is continuously dispensed from the exit opening into the cavity along this line. This allows continuous material application and therefore rapid progress of the work when filling the cavity/cavities with the second material. The second material can be supplied to the jet by means of a known micro-pump suitable for a continuous conveying process, or by applying a gas pressure to the second material. Conveying the second material out of the jet channel takes place either directly, by means of a piezo activator for high viscosities, by means of a piezo activator for a jet channel slide (closes/opens the jet channel), or it is pressed into the channel by means of compressed air. In the latter case, the compressed air can be electromagnetically activated by means of a solenoid valve.

In an advantageous embodiment of the invention, a support film is made available, on which the second material is arranged, wherein the second material has a greater viscosity than the first material and/or contains a higher solids proportion than the first material, wherein the carrier film is positioned at the cavity, so as to fill the cavity with the second material, in such a manner that the second material situated on the support film faces the cavity, wherein an energy beam which can pass through the support film is directed at the support film in such a manner that the second material liquefies on the side of the support film that faces the cavity, due to being heated, and is dispensed into the cavity. The second material is therefore filled into the cavities, preferably selectively, by means of a transfer printing method. Preferably, a laser beam is used as the energy beam. However, it is also conceivable that the energy beam is an electron beam. The energy beam can be deflected to a neutral position during application of the material, so as to position it at different locations of the support film. Deflection can take place as a function of the geometry data made available for the shaped object and as a function of the relative position between the energy beam, which is in the neutral position, and the support part. In the case of a laser beam, deflection can take place by means of adjustable optics, in particular by means of a galvano mirror and/or a polygon mirror. If an electron beam is used as the energy beam, it is practical if this beam is deflected by means of a magnetic field.

In a further development of the invention, the second material is filled into the cavity by means of a flexographic printing method, a gravure printing method, an offset printing method, a screen printing method, a laser transfer method, a micro-metering method, by means of a doctor blade or a chamber doctor blade. The second material is therefore filled into the cavity/cavities using an analog printing method. This allows a high printing speed by means of the area-wide imprinting.

In a further advantageous embodiment of the invention, the second material is a thermoplastic, which is liquefied by means of being heated, then filled into the cavity, and afterward solidified by means of cooling. In this process, a UV radiation source is not required for solidification of the second material; instead, the material is simply cooled.

It is practical if the uppermost solidified negative-shape layer and/or the uppermost solidified shaped-object layer is/are cleaned to remove the chips that occur during machining material removal. As a result, a level and clean surface occurs, onto which a further material layer can be applied with great precision.

In a preferred embodiment of the invention, the support part that has the base surface is rotated about an axis of rotation during the material application and, if necessary, during solidification of the materials, and preferably displaced along the axis of rotation. In this way, interruption-free printing of a plurality of material layers arranged one on top of the other is made possible. This allows rapid material application. When the second material is filled into the cavity by means of a transfer printing method, the energy beam can be positioned at multiple material dispensing locations of the support film, one after the other, which locations are arranged above an application location for the material assigned to them, in each instance, so that the second material situated on the support film can be heated by means of the energy beam, in such a manner that the material is transferred to the cavity situated at the application location, wherein the power of the energy beam is adjusted in such a manner that in the case of positioning of the energy beam at a first material dispensing location that is farther removed from the axis of rotation than a second material dispensing location, the energy beam has greater power than in the case of positioning of the energy beam at the second material dispensing location. This power adjustment has the advantage that the same amount of material is dispensed at every material dispensing location. This is primarily necessary when using a rotating platform, on which the inside diameter is smaller than the outside diameter, which consequently makes a narrower beam necessary on the inside than on the outside.

BRIEF DESCRIPTION OF THE DRAWINGS

In the following, exemplary embodiments of the invention are explained in greater detail, using the drawings. These show.

DESCRIPTION OF THE INVENTION

In a method for producing a three-dimensional mold and a three-dimensional shaped object 1 by means of layer-by-layer material application, geometry data for the shaped object 1 are made available by a control unit that communicates with a computer on which software is running.

Figure 1:
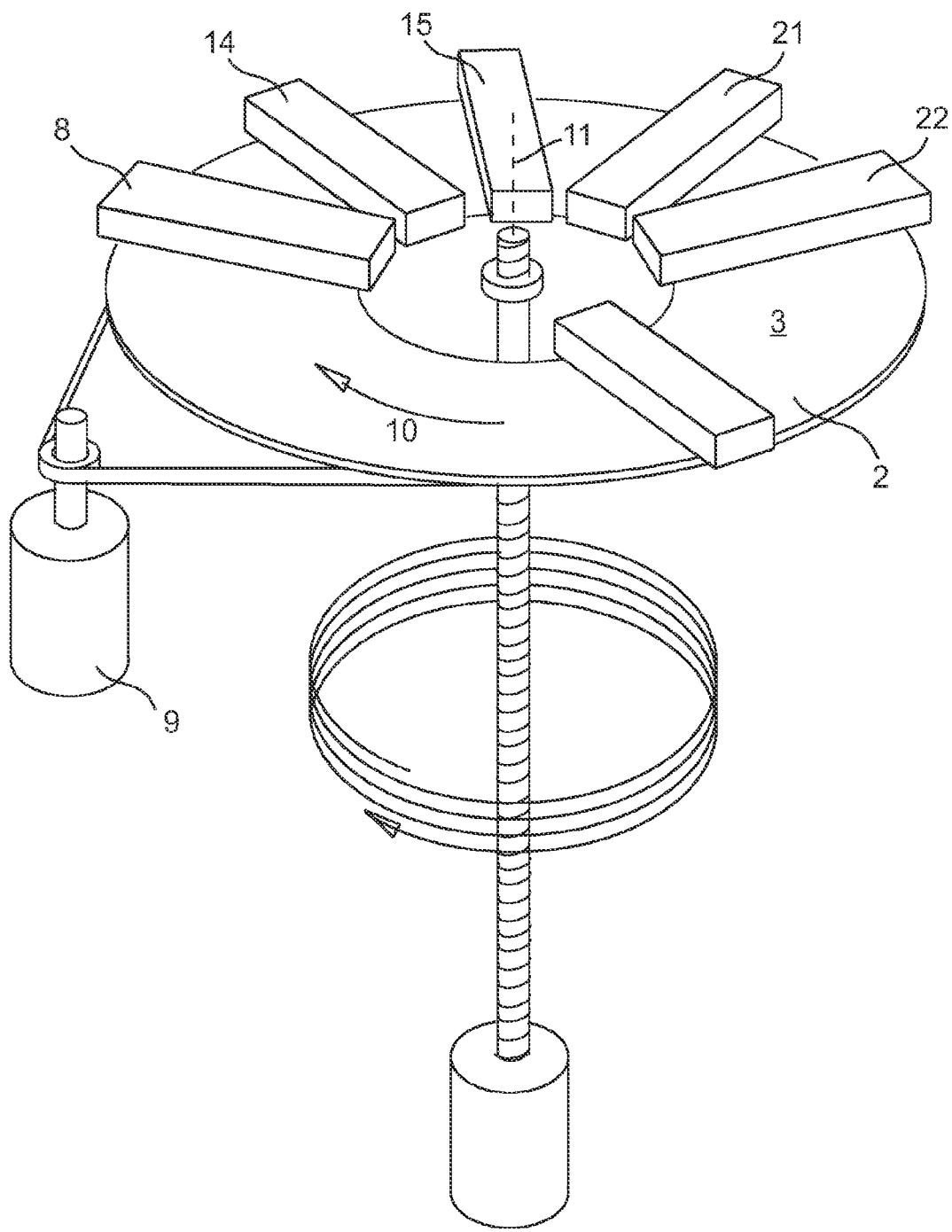
FIG. 1 a preferred apparatus in a polar embodiment, for producing a three-dimensional shaped object by means of layer-by-layer material application, wherein the apparatus has different dispensing devices for dispensing different liquid materials that can be solidified, FIG. 2 a side view of an apparatus for producing a three-dimensional shaped object, wherein the apparatus has a first dispensing device, which has jets for layer-by-layer application of a liquid first material and a second material application station configured as a flexographic printing apparatus or a gravure printing apparatus for application of a liquid second material, FIG. 3A to 3F a cross-section through a shaped object during different method steps of its production, FIGS. 4 and 4A a side view of a thickness milling tool during milling removal of a material layer, FIG. 5 a cross-section through a first exemplary embodiment of a shaped object after application of all the material layers, FIG. 6 a schematic representation of the solidified material layers of the shaped object consisting of the first and second material, wherein the layers are shown in transparent form, FIG. 7 a three-dimensional view of a layer stack consisting of the material layers of the first and second material, FIG. 8 a three-dimensional view of the shaped object after removal of the material layer of the first material, using a solvent, FIG. 9 a cross-section through a second exemplary embodiment of a shaped object after application of all the material layers, FIG. 10 a cross-section through the second exemplary embodiment of the shaped object after removal of the material layers of the first material, FIG. 11 a side view of an apparatus similar to FIG. 2, wherein, however, a rotation screen printing apparatus is provided in place of the flexographic printing apparatus, FIG. 12 a side view of an apparatus similar to FIG. 2, wherein, however, a chamber doctor blade coating apparatus is provided in place of the flexographic printing apparatus, FIG. 13 a cylindrical coating roll, FIG. 14 a coating roll in the form of a truncated cone, FIG. 15 a side view of an apparatus similar to FIG. 2, wherein, however, an inkjet printing apparatus for higher viscosities is provided in place of the flexographic printing apparatus, FIG. 16 a side view of an apparatus similar to FIG. 2, wherein, however, a hot-melt apparatus or a micro-metering/micro-coating apparatus is provided in place of the flexographic printing apparatus, FIG. 17 an enlarged detail from FIG. 16, which shows a jet during filling of a cavity with the second material, FIG. 18 a schematic representation of a print head module for applying the second material, FIG. 19 a cavity that was filled with the second material, FIG. 20 a micro-metering unit having a jet that has a circular exit opening, and FIG. 21 a micro-metering unit having a jet that has a rectangular exit opening.

Furthermore, a plate-shaped support part 2 having a base surface 3 arranged in a horizontal plane, for holding the shaped object 1, is made available. As can be seen in FIG. 1, the base surface 3 essentially has the shape of a circular ring disk. However, other embodiments are also conceivable, in which the base surface 4 particularly can have the shape of a full circular disk or can be configured to be rectangular.

Furthermore, in the method a liquid first material 4 that can be solidified, a liquid second material 5 that can be solidified, different from the first, and water as a solvent for the solidified first material 4 are made available. The solidified second material 5 cannot dissolve in the solvent. The second material 5 is selected in such a manner that it has a greater strength in the solidified state than the solidified first material 4. For this reason, the second material 5 has a greater viscosity than the first material 4. In this exemplary embodiment, the first material 4 is a polymer that contains a photo-initiator and can be cross-linked by means of irradiation with ultraviolet radiation.

Figure 2:
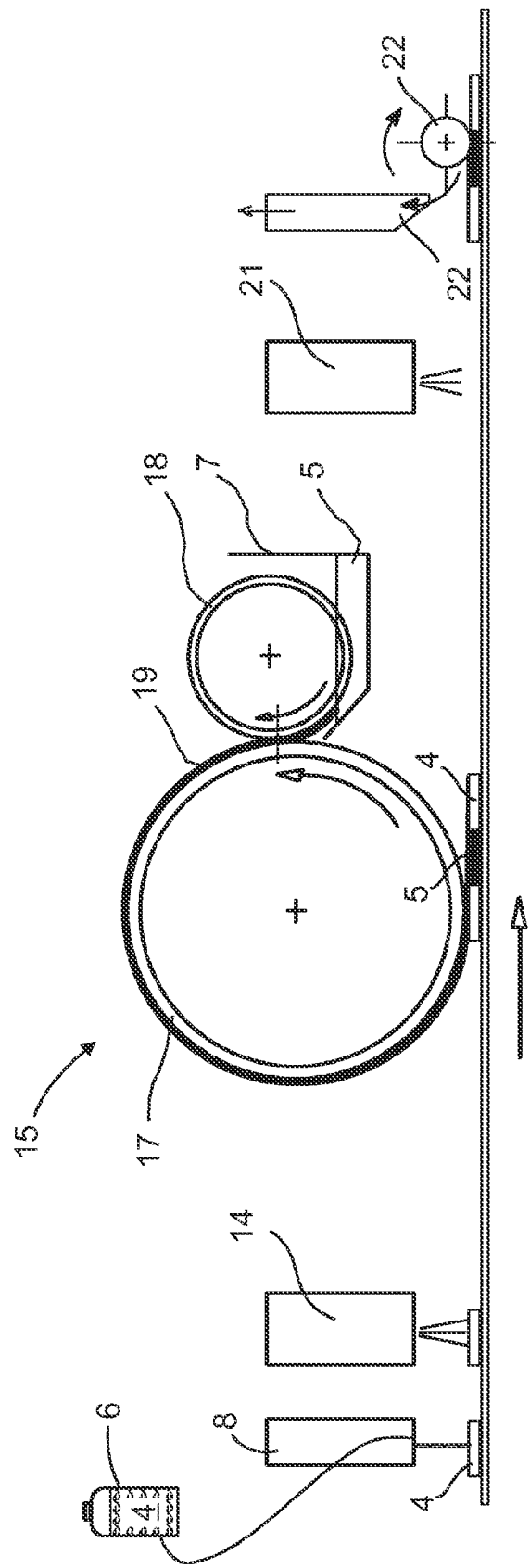

The liquid first material 4 is arranged in a first reservoir 6, and the liquid second material 5 is arranged in a second reservoir 7. The first reservoir 6 is connected with a first dispensing device 8 for the first material 4 by way of a line. As can be seen in FIG. 2, the first reservoir 5 is configured as an essentially closed container, and the second reservoir 7 is configured as a vat.

The first dispensing device 8 has a first inkjet printing head having a plurality of jets arranged in a row, which are not shown in any detail in the drawing, and are set up for dispensing material portions of the first material 4 onto the base surface 3 or onto a solidified material layer of the first and/or second material 4, 5 situated on this surface. The row of jets is arranged parallel to the plane of the base surface 4 and extends transverse to the circumference direction of the base surface 3, preferably essentially radially towards its center.

The support part 2 and the first dispensing device 8 can be rotated relative to one another using a first positioning device 9, in and opposite to the direction of the arrow 10, and can be displaced parallel to the axis of rotation 11. During this process, points that lie in the base surface 3 and are at a distance from the axis of rotation 11 move along a path curve shaped like a helical line or screw line.

Figure 3A:
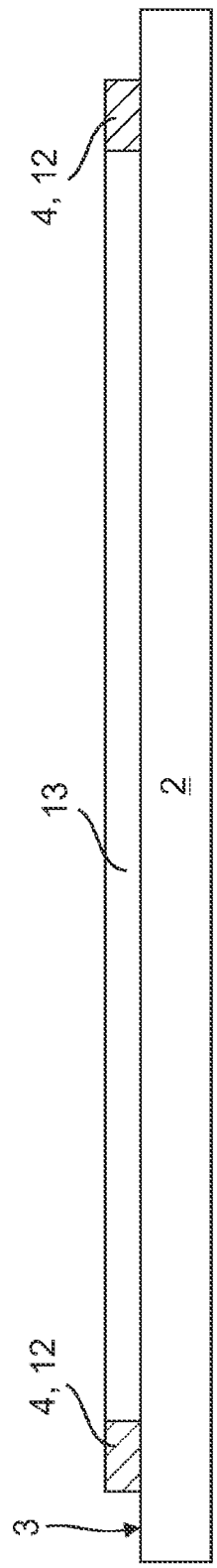

The first dispensing device 8 and the first positioning device 9 are connected with a control device, not shown in any detail in the drawing, which has a data memory for storage of the geometry data of the shaped object 1 to be produced. Dispensing of the material portions of the first material 4 as well as the first positioning device 9 can be controlled by means of the control device, as a function of the geometry data, in such a manner that negative-shape layers 12 consisting of the flowable first material 4 can be applied to the base surface or to a solidified material layer of the first and/or second material 4, 5 that was previously applied to this surface (FIG. 3A). In this regard, the negative-shape layers 12 each have at least one cavity 13, which has a negative shape of a material layer of the shaped object 1 to be produced. The cavities 13 extend, in each instance, over the entire layer thickness of the negative-shape layer 12 in question, all the way to the base surface 3 or to the solidified material layer situated under the negative-shape layer 12.

A first solidification device 14 is arranged behind the first dispensing device 8 in the direction of the arrow 10, by means of which device the liquid first material 4 applied to the base surface 3 or to a solidified material layer situated on this surface can be solidified. For this purpose, the first solidification device 14 has a first UV radiation source, not shown in any detail in the drawing, by means of which the ultraviolet radiation can be dispensed to the material layer of the first material to be solidified, in such a manner that a photo-cross-linking agent contained in the first material is activated and the polymers contained in the first material 4 are cross-linked.

Figure 3B:
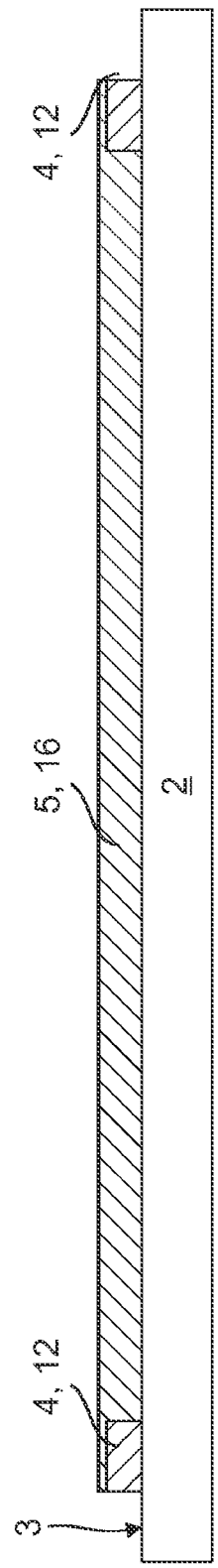

A second dispensing device 15 is arranged behind the first solidification device 14 in the direction of the arrow 10, by means of which device the cavity/cavities 13 of the corresponding negative-shape layer 12 that was previously solidified are filled with the second material 5, so as to form a shaped-object layer 16 (FIG. 3B). In the exemplary embodiment shown in FIG. 2, the second dispensing device 15 is configured as a flexographic printing apparatus.

This apparatus has a transfer body 17 configured as a flexographic printing roll, and a coating device 18 that stands in contact with the second reservoir 7, by means of which device the at least one surface region of the transfer body 17 can be coated with a layer 19 of the second material 5. Using a second positioning device, the conical transfer body 17 can be rotated about an imaginary axis of rotation, in such a manner that the layer 19 of the second material 5 situated on the mantle surface of the transfer body 17 comes into contact with the bottom and the inner wall of the cavity/cavities 13, in such a manner that the flowable second material 5 is filled into the cavity/cavities and then forms the shaped-object layer 16. This layer has the positive shape of a layer of the shaped object 1 to be produced, which shape is inverse to the negative shape of the layer 12.

Afterward, the shaped-object layer 16 obtained in this manner is solidified using a second solidification device 21. As can be seen in FIG. 1, the second solidification device 21 is arranged behind the second dispensing device 14 in the direction of the arrow 10. The second solidification device 21 contains a second UV radiation source, by means of which ultraviolet radiation can be dispensed onto the shaped-object layer 15, so as to solidify the second material by means of cross-linking the polymers contained in it.

Figure 3C:
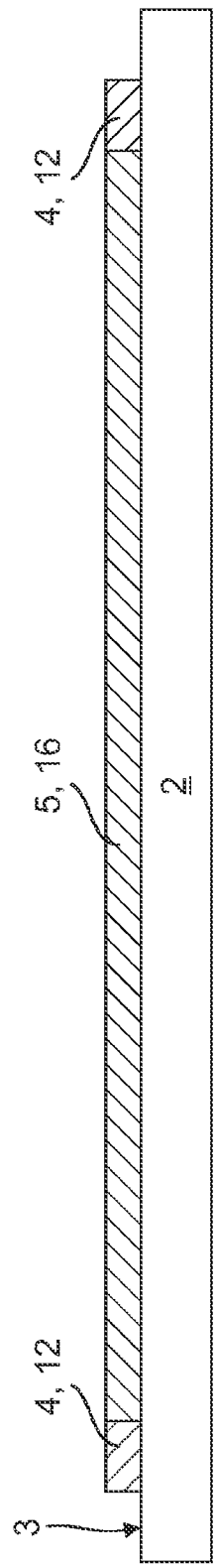

Afterward, in a further method step, regions of the solidified negative-shape layer 12 and/or of the solidified shaped-object layer 16 and/or of the solidified second material 5 that is arranged on the negative-shape layer are removed by means of a thickness milling tool 22 (FIG. 3C, 4, 4A). During this process, regions of the solidified first and/or second material 4, 5 that project beyond a plane arranged at a predetermined distance from the base surface, parallel to it, are completely removed by means of machining material removal, and subsequently vacuumed away by means of a suction nozzle 23. If necessary, a surface cleaning device 20 can be arranged behind the suction nozzle 23.

Figure 3D:
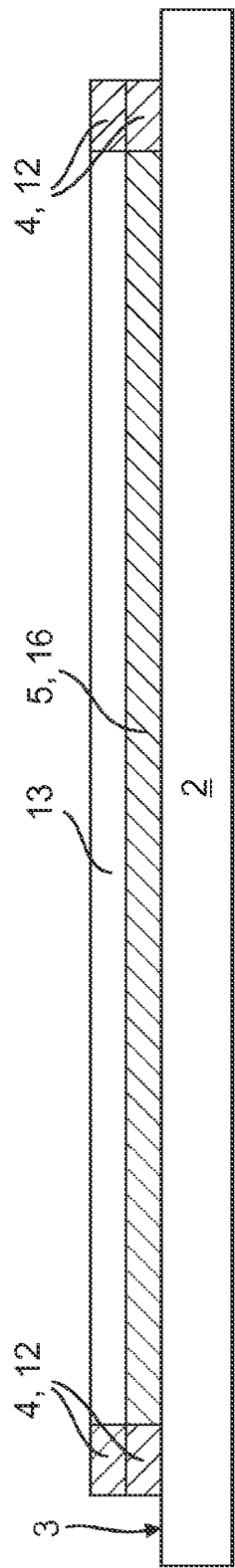
Figure 3E:
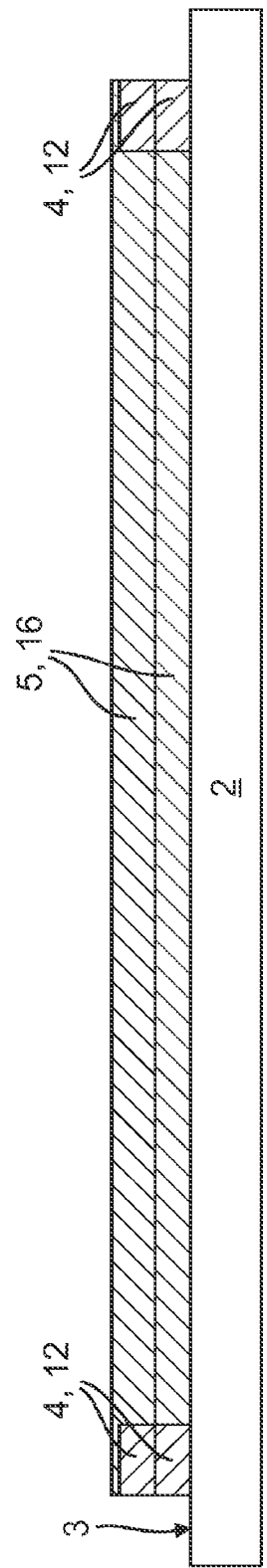
Figure 3F:
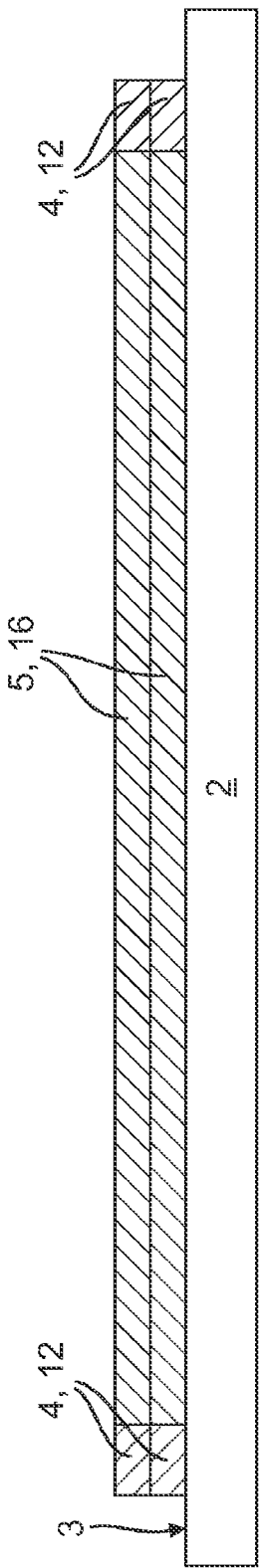
Figure 6:
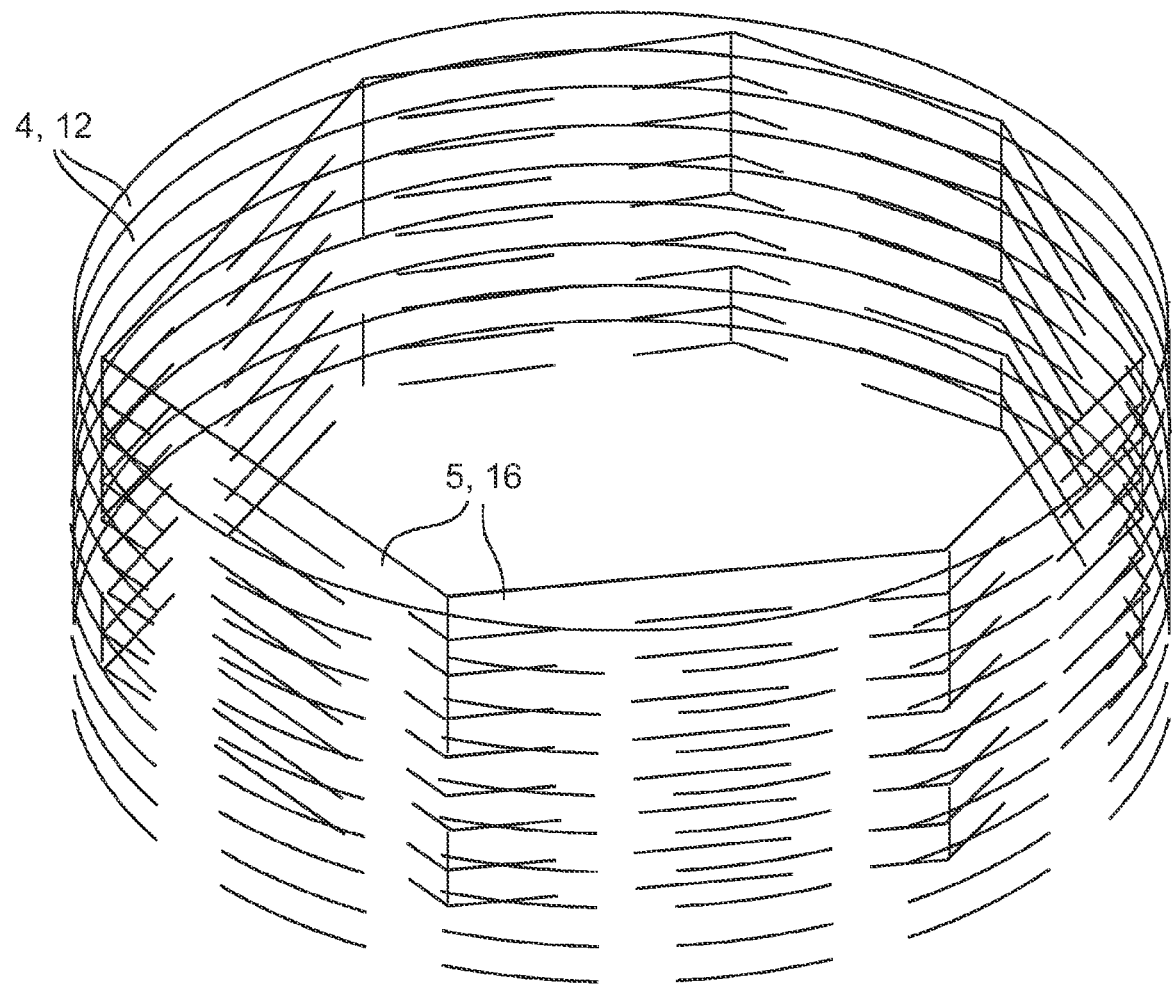
Figure 7:
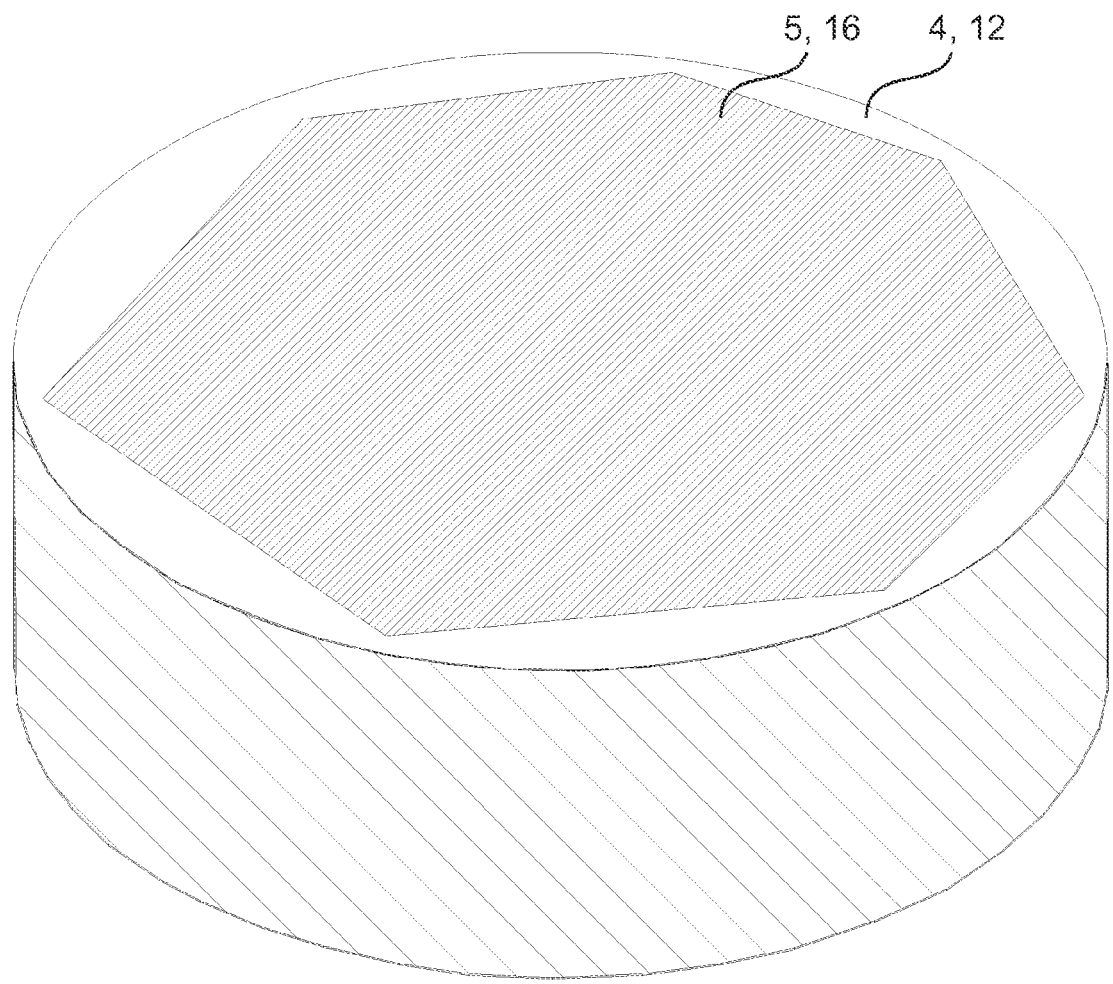
Figure 8:
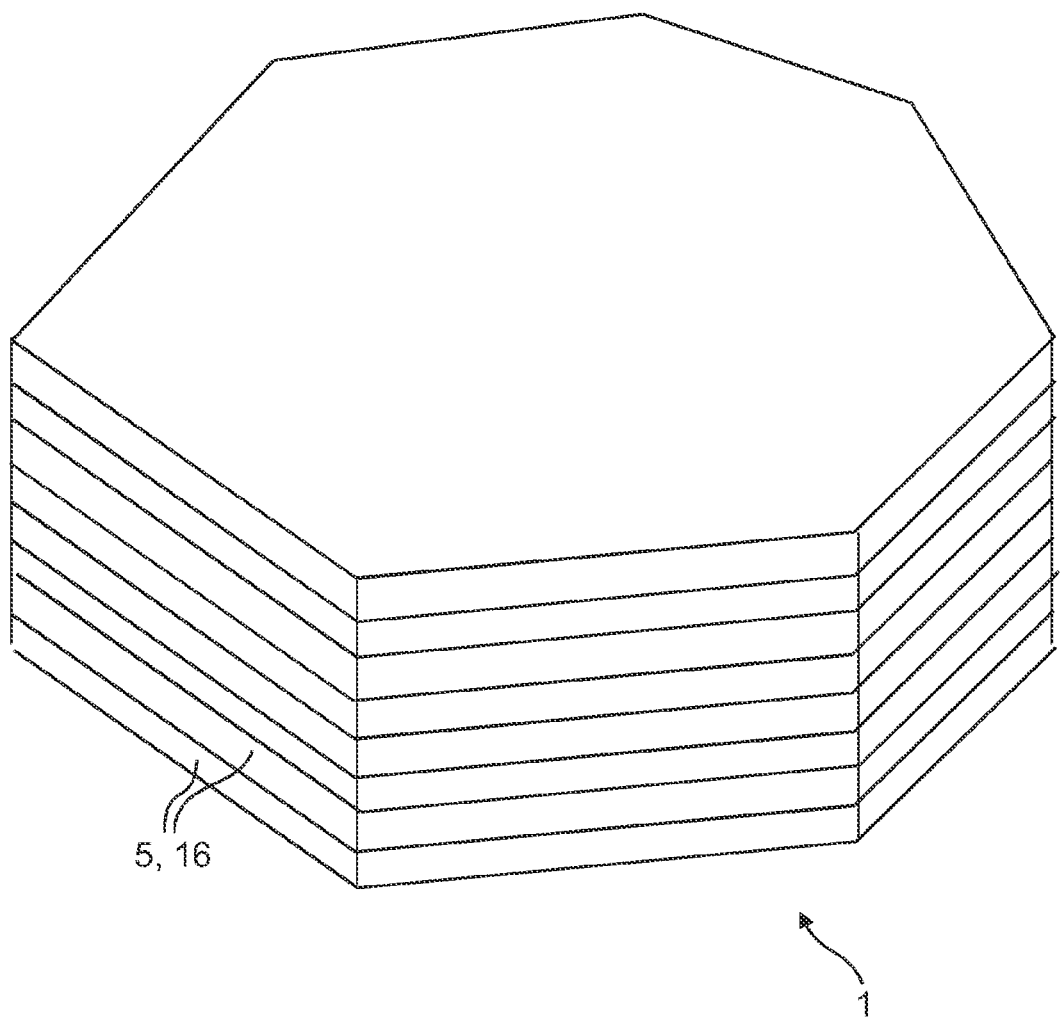

Now, in a corresponding manner, a further negative-shape layer 12 (FIG. 3D) and a further shaped-object layer 16 are applied to the surface of the solidified negative-shape layer 12 and the shaped-object layer 16 (FIG. 3E, 3F). These steps are repeated until all the shaped-object layers 16 of the shaped object to be produced have been produced (FIG. 5 to 8).

In a further method step, the negative-shape layers 12 are brought into contact with the solvent in such a manner that the solidified first material 4 completely dissolves in the solvent. This result can be achieved, for example, in that the layer stack consisting of the negative-shape layers 12 and the shaped-object layers 16 is immersed in the solvent for a predetermined period of time. Afterward, the finished shaped object (FIG. 8) is removed from the solvent and dried.

Figure 9:
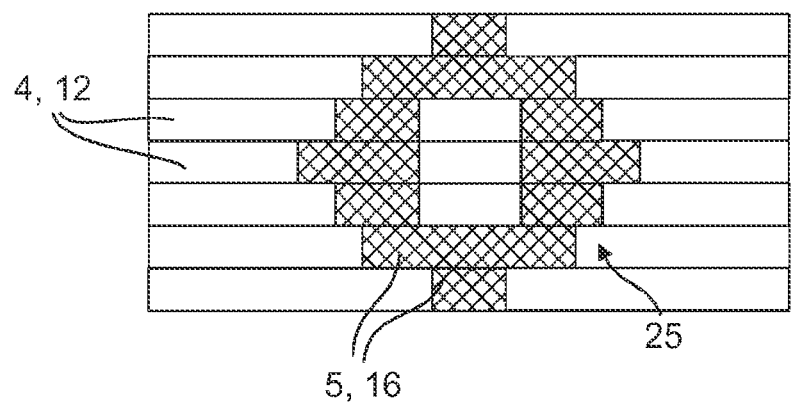
Figure 10:
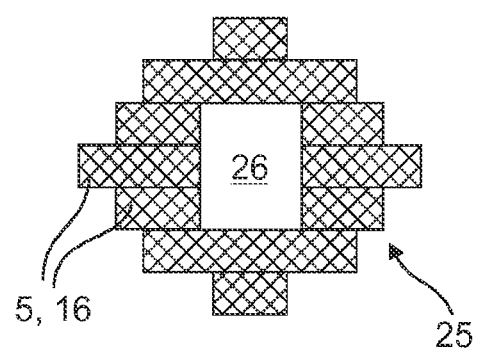

As can be seen in FIGS. 9 and 10, it is also possible to produce shaped objects having overhangs 25 and cavities 26, using the method according to the invention.

Figure 11:
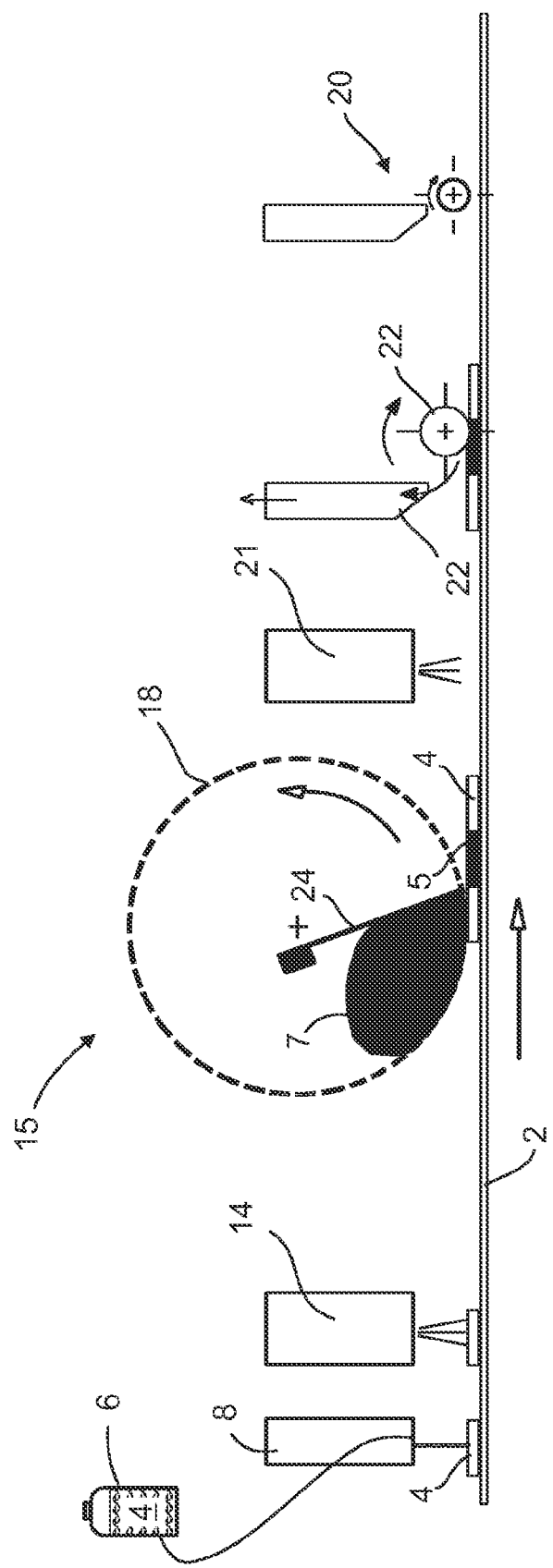

The second material 5 can also be filled into the cavity/cavities 13 using a screen-printing method. As can be seen in FIG. 11, in this process the transfer body 18 is configured as a rotation screen-printing roll. This roll has a perforated, screen-like mantle surface. The second reservoir 6 is arranged in the inner cavity of the rotation screen-printing roll.

The perforated holes provided in the mantle surface are coordinated with the viscosity of the second material 5, with regard to their dimensions, in such a manner that the second material 5 can be pressed through the perforated holes by means of a doctor blade 24 that lies against the inner mantle surface of the cylinder wall of the rotation screen-printing roll in line shape. Outside of the region of effect of the doctor blade 24, the second material 5 does not pass through the perforated holes. A cleaning apparatus placed behind the dispensing location removes the material not taken off from the rotation screen-printing roll, and passes it back into the circuit for re-use. For the remainder, the apparatus shown in FIG. 11 corresponds to that shown in FIG. 2, so the description of FIG. 2 applies analogously to FIG. 11.

Figure 12:
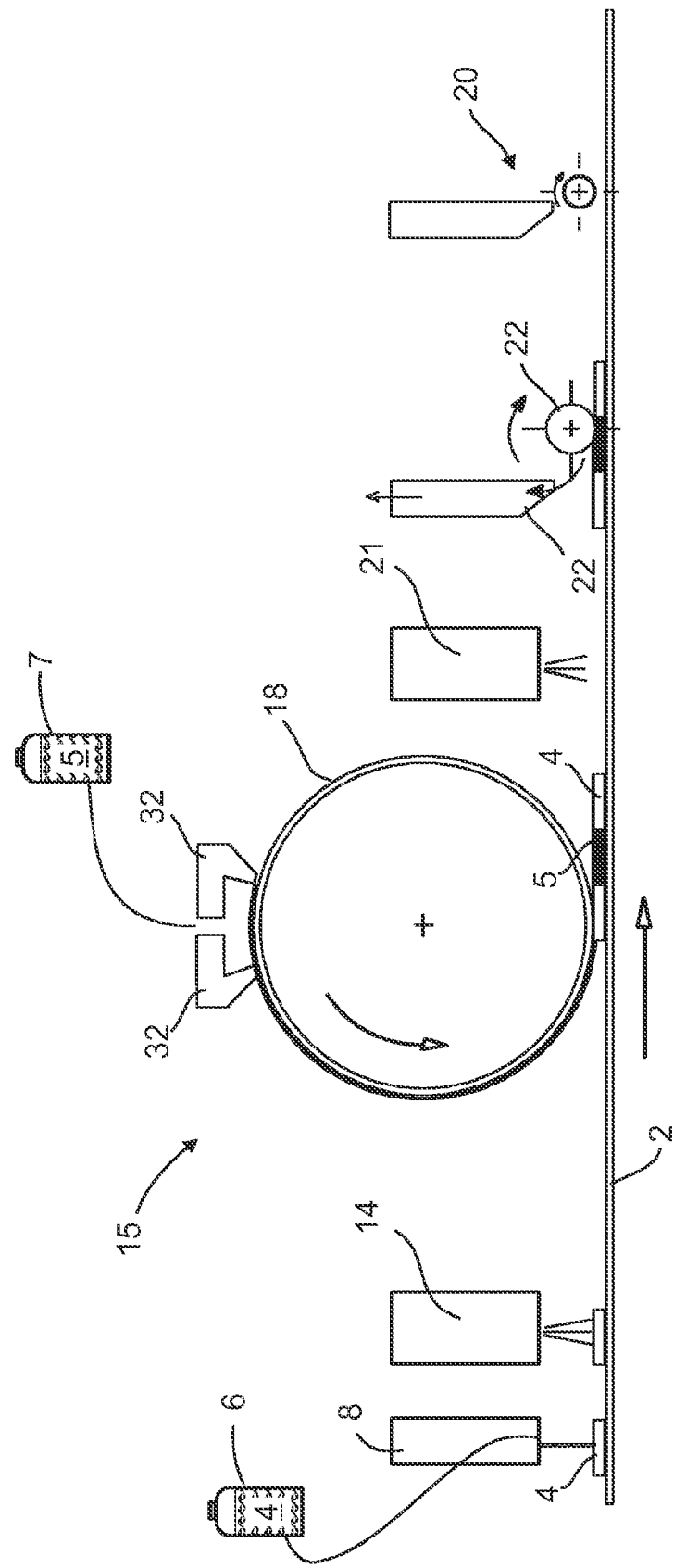

The second material 5 can also be filled into the cavity/cavities 13 using the chamber doctor blade method. As can be seen in FIG. 12, in this regard the transfer body 18 is structured as a raster roll, on the outer mantle surface of which a chamber doctor blade 32 is arranged. The raster roll has a correspondingly engraved mantle surface, prepared to hold the material. For the remainder, the apparatus shown in FIG. 12 corresponds to that shown in FIG. 2, so that the description of FIG. 2 applies analogously to FIG. 12.

Figure 13:
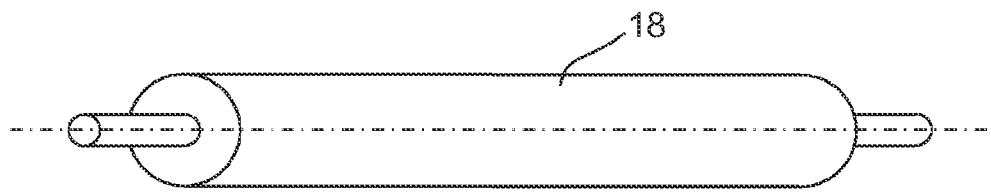
Figure 14:
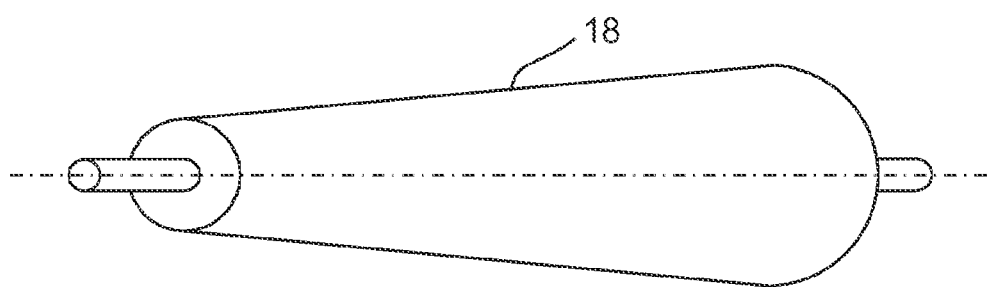

While the roll of the coating device 18 has a cylindrical shape in the case of the Cartesian method (FIG. 13), in the case of the polar method the roll has a conical shape (FIG. 14).

Figure 15:
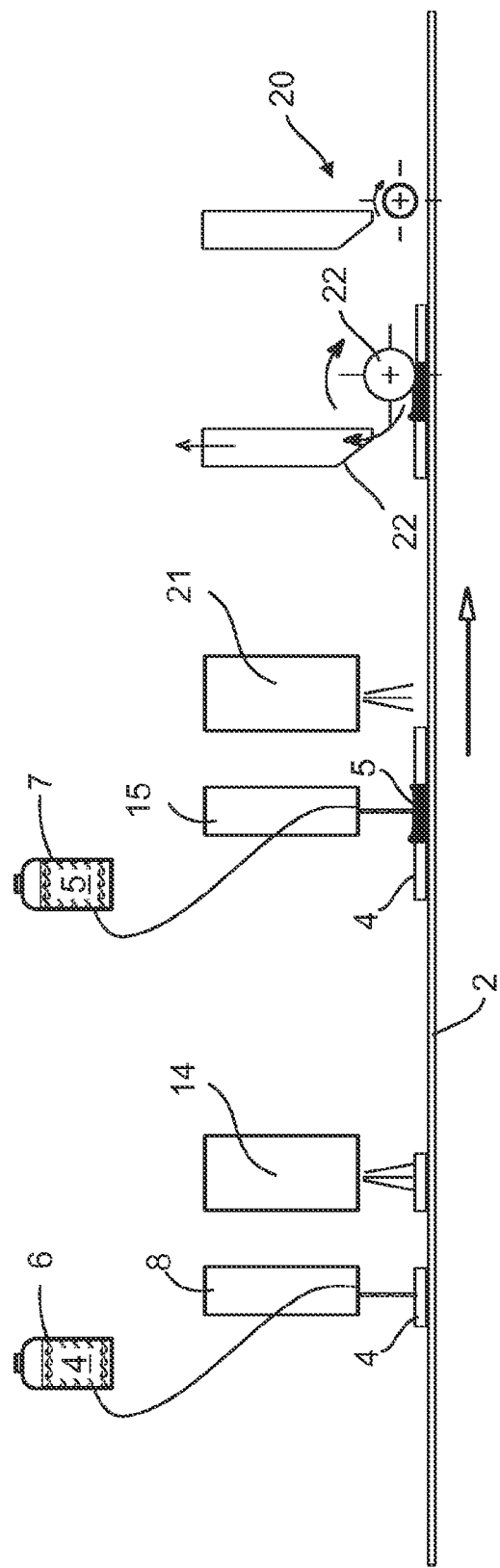

The second material 5 can also be filled into the cavity/cavities 13 using the inkjet printing method (FIG. 15). For this purpose, the second dispensing device 15 has a second inkjet printing head having a plurality of jets arranged in a row, which are set up for dispensing material portions of the second material 5 onto the base surface 3 or onto a solidified material layer of the first and/or second material 4, 5 situated on this surface. The row of jets is arranged parallel to the plane of the base surface 4 and extends transverse to the circumference direction of the base surface 3, preferably essentially radially towards its center. Since the second material 5 has a greater viscosity than the first material 4, the jets of the second inkjet printing head have a greater cross-section than those of the first inkjet printing head. Instead of working with a greater jet cross-section or in addition to that, it is also possible to work with a higher jet pressure than that of the first jets in the case of the jets of the second inkjet printing head. Positioning of the support part 2 relative to the inkjet printing head takes place in accordance with FIG. 1, using a positioning device. Ejection of the second material 5 is controlled as a function of the relative position between the inkjet printing head and the support part 2 and as a function of the geometry data made available for the shaped object 1 to be produced.

Figure 16:
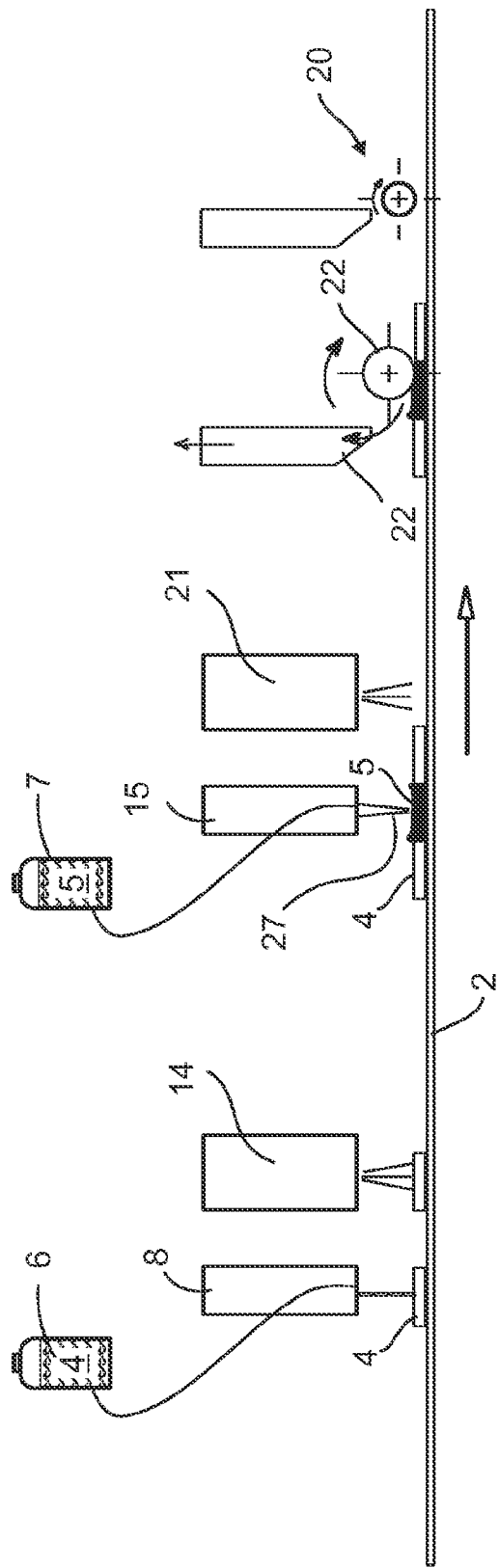
Figure 17:
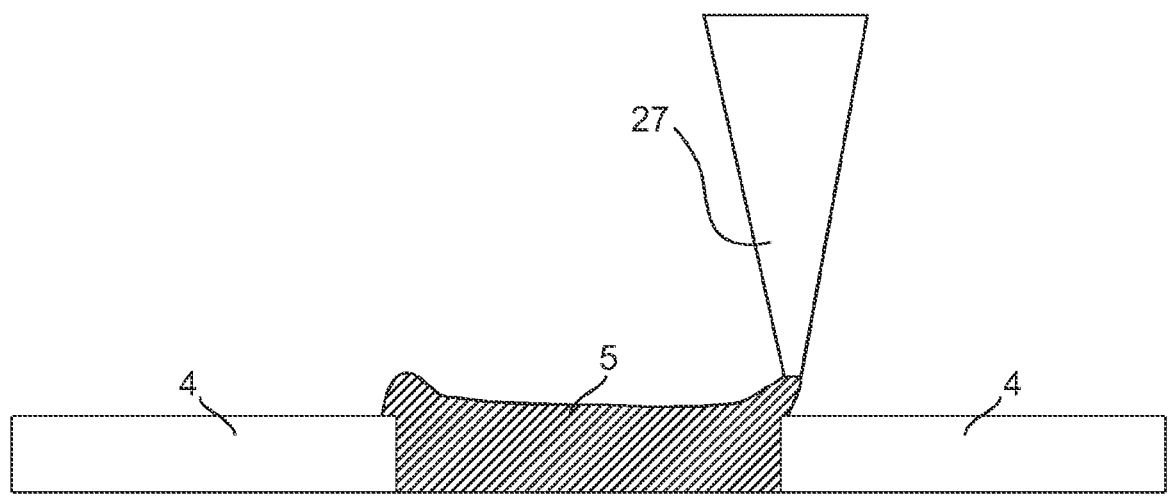

In the case of the exemplary embodiment shown in FIG. 16, the second material 5 is filled into the cavity/cavities 13 using the jet method or hot-melt method. In the case of the jet method, a high-viscosity second material 5 is conveyed through a jet exit at room temperature or in a state in which it is heated as compared with room temperature, by means of gas pressure. In the case of the hot-melt method, the second material 5 is a thermoplastic plastic that is solid at room temperature and can be liquefied by means of heating it. During the printing process, the second material is heated in such a manner that it becomes liquid, and then it is dispensed onto the base surface 3 or onto a solidified material layer of the first and/or second material 4, 5 situated on this surface, by means of a metering pump, a conveying screw or gas pressure, through a jet 27 directed at the cavity 13 to be filled (FIG. 17). Positioning of the support part 2 relative to the jet 27 takes place in accordance with FIG. 1, using a positioning device 9. Ejecting the second material 5 from the jet 27 is controlled as a function of the relative position between the jet 27 and the support part 2 and as a function of the geometry data made available for the shaped object 1 to be produced. After the second material has been filled into the cavity/cavities 13, it is solidified by means of cooling.

Figure 18:
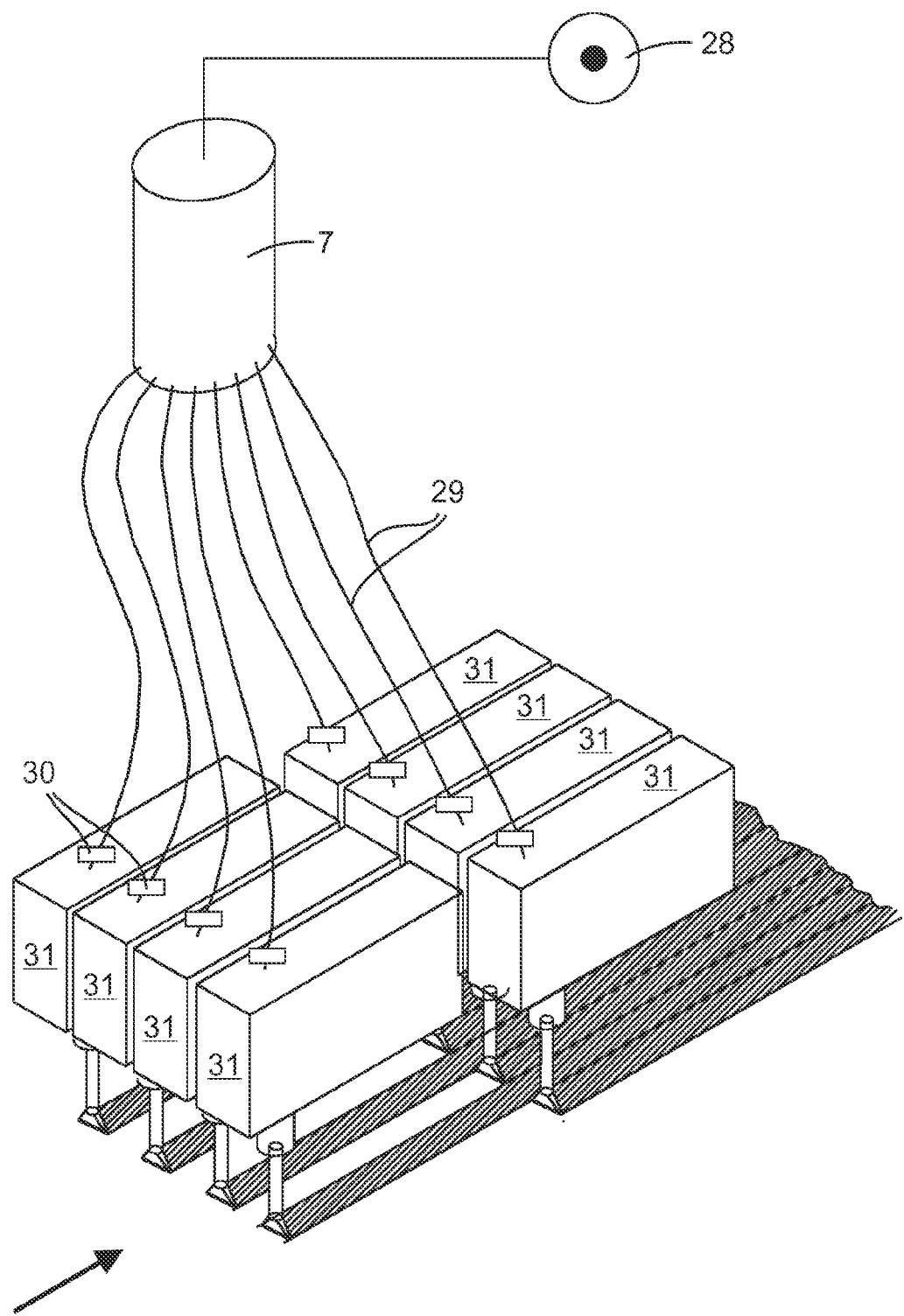

Furthermore, the possibility exists of filling the second material 5 into the cavity/cavities 13 by means of a micro-metering method. As can be seen in FIG. 18, in this regard the second reservoir 7 is connected with a gas pressure source 28, which can be a compressed-air source, for example, so as to put pressure on the second material 5. The reservoir 7 is connected with a jet 27 for dispensing material, by way of lines 29 in which a valve 30 that can be adjusted between an open position and a closed position, in each instance, is arranged. The exit opening of the jet 27 is arranged with its exit opening at a slight distance from the base surface 3 [sic-duplication of "exit opening" in the German], and then positioned in such a manner along the base surface 3, relative to the support part 2. The individual valves 30 are controlled, in each instance, as a function of the geometry data made available for the shaped object 1 to be produced, and as a function of the relative position between the jet 27 and the support part 2, in such a manner that the material flow of the second material 5 is released when the exit opening of the jet 27 is positioned at the cavity 13. The material flow is blocked when the exit opening of the jet 27 is not positioned at the cavity 13.

Figure 19:
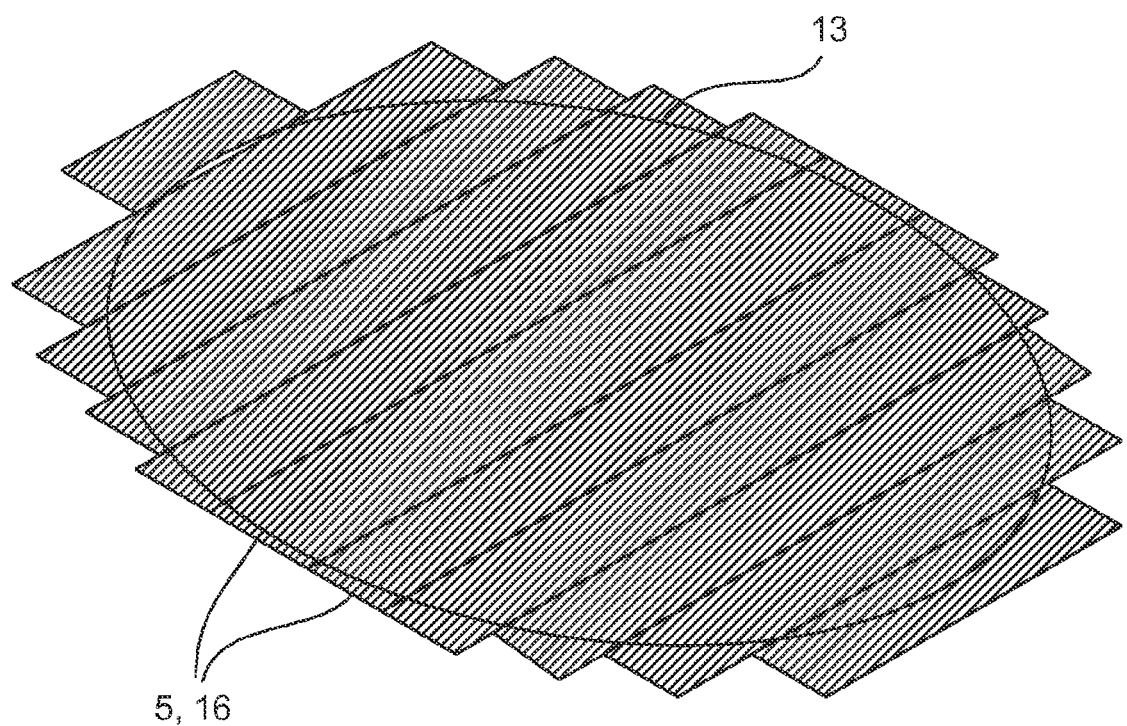
Figure 20:
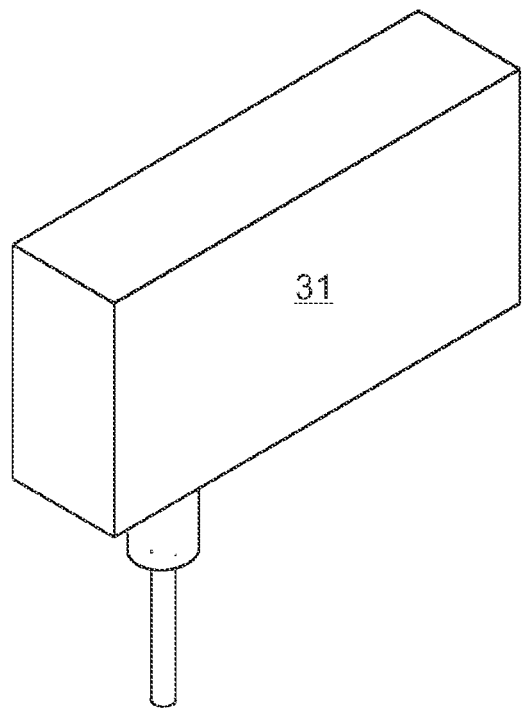
Figure 21:
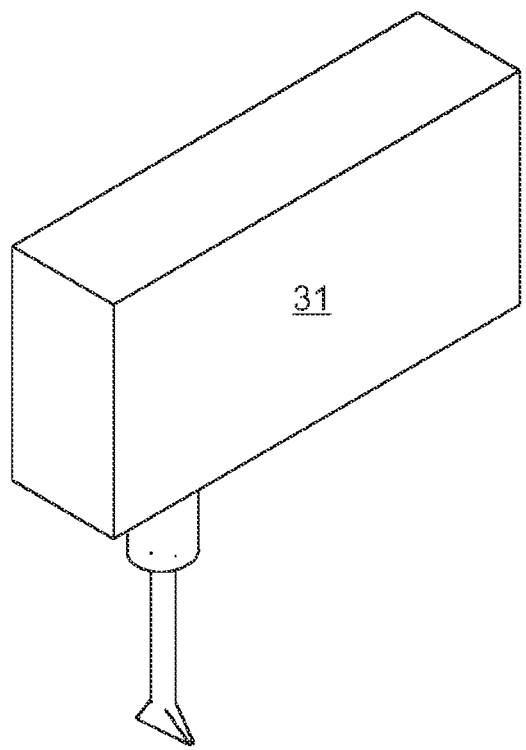

As can be seen in FIG. 18, multiple micro-metering units 31 can be provided, the valve 30 of which is connected with the second reservoir 7 with its inlet, in each instance, by way of a line 29. Each micro-metering unit 31 has a jet 27, in each instance, which is connected with the outlet of the valve 30 in question. The jets 27 are arranged in matrix shape, in multiple rows and/or multiple columns. The valves 30 are controlled in such a manner that the second material 5 is applied to the cavity 13 in planar manner (FIG. 19). The jet 27 can have a round (FIG. 20) or a polygonal, preferably a rectangular (FIG. 21) exit opening.

The invention claimed is:

1. A method for producing a three-dimensional shaped object by layer material application, the method comprising:
   a) providing geometry data for the three-dimensional shaped object, a support part having a base surface for holding the three-dimensional shaped object, a liquid or flowable first material that can be solidified, a liquid, flowable, paste-like or powder-form second material that can be solidified, and a solvent, wherein the second material, in a solidified state, has a greater strength than the first material in a solidified state, and the first material in the solidified state can be dissolved in the solvent;
   b) forming a negative-shape layer, by applying material portions of the flowable first material to the base surface and/or to a solidified material layer of the three-dimensional shaped object situated on the base surface, in accordance with the geometry data, wherein the negative-shape layer has at least one cavity on a surface facing away from the base surface, which cavity has a negative shape of a material layer of the three-dimensional shaped object to be produced;
   c) solidifying the negative-shape layer to form a mold;
   d) filling the mold with the second material to form a shaped-object layer, wherein the negative shape is transferred to the shaped-object layer as a positive shape;
   e) solidifying the second material filled into the mold;
   f) removing regions of the solidified negative-shape layer and/or of a solidified shaped-object layer projecting beyond a plane arranged at a predetermined distance from the base surface by machining material removal;
   g) repeating steps a) to f) at least once; and
   h) bringing the negative-shape layers into contact with the solvent in such a manner that the solidified first material dissolves in the solvent.

2. The method according to claim 1, wherein the material portions of the first material are applied to the base surface and/or to the solidified negative-shape layer situated on the base surface and/or to a solidified shaped-object layer, the first material is a material that can be solidified by applying energy, and solidifying the negative-shape layer comprises applying energy to the negative-shape layer.

3. The method according to claim 2, wherein a gas pressure is applied to the second material, and the second material put under pressure is passed to at least one jet by way of at least one valve, an exit opening of the at least one jet is positioned along the base surface relative to the support part, the at least one valve is controlled as a function of the geometry data made available for the three-dimensional shaped object to be produced and as a function of a relative position between the at least one jet and the support part, the material flow is released when the exit opening is positioned at the at least one cavity, and the material flow is blocked when the exit opening is not positioned at the at least one cavity.

4. The method according to claim 1, wherein a viscosity of the second material in a non-solidified state is greater than the viscosity of the first material in a non-solidified state and/or the flowable first material and the flowable, paste-like or powder-form second material have a solids proportion and the solids proportion of the second material in the non-solidified state is greater than the solids proportion of the first material in-its the non-solidified state.

5. The method according to claim 4, wherein the viscosity of the second material in the non-solidified state is at least 10 times greater than the viscosity of the first material in the non-solidified state and/or the solids proportion of the second material in the non-solidified state is at least 10 times greater than the solids proportion of the first material in the non-solidified state.

6. The method according to claim 1, wherein the first material has a working viscosity suitable for jetting, which is less than 1000 mPa·s, and is applied to the base surface and/or to the solidified material layer of the three-dimensional shaped object situated on the base surface, in the form of droplets of liquid, at a resolution of at least 360 dpi.

7. The method according to claim 1, wherein the second material is applied to the negative-shape layer by a selective coating method, as a function of the geometry data, at least one material portion of the flowable, paste-like or powder-form second material is dispensed into the at least one cavity, and at least one location of the negative-shape layer situated outside of the at least one cavity is not brought into contact with the second material.

8. The method according to claim 7, wherein the second material has a greater viscosity and/or a greater solids proportion than the first material, both the first material and the second material are applied to the base surface and/or to a solidified negative-shape layer situated on the base surface and/or a shaped-object layer by an inkjet printing method, in the inkjet printing method, the first material is ejected from at least one first jet and the second material is ejected from at least one second jet, and an exit opening of the at least one second jet has a greater cross-section than an exit opening of the at least one first jet and/or a higher working pressure applied to the at least one second jet than is applied to the at least one first jet.

9. The method according to claim 8, wherein the exit opening of the at least one second jet is moved along a continuous line that runs within the at least one cavity, relative to the support part and the liquid, flowable or paste-like second material is continuously dispensed along this line, from the exit opening into the at least one cavity.

10. The method according to claim 8, wherein a diameter of the exit opening of the at least one second jet is greater than a diameter of the exit opening of the at least one first jet.

11. The method according to claim 7, wherein a support film is provided, on which the second material is arranged, the second material has a greater viscosity than the first material and/or contains a greater solids proportion than the first material, the support film is positioned at the at least one cavity during filling of the at least one cavity with the second material the second material situated on the support film faces the at least one cavity, and an energy beam for which the support film is permeable is directed at the support film in such a manner that the second material is heated and liquefied on a side of the support film facing the at least one cavity and is dispensed into the at least one cavity.

12. The method according to claim 1, wherein the second material is a composite comprising a fluid and at least one additive, the fluid has a viscosity of at least 50 mPa·s at room temperature, and the additive contains solid particles that are arranged in the fluid.

13. The method according to claim 1, wherein the second material is filled into the at least one cavity using a flexographic printing method, a gravure printing method, an offset printing method, a screen printing method, a laser transfer method, a micro-metering method, and/or using a doctor blade or a chamber doctor blade.

14. The method according to claim 1, wherein the second material is a thermoplastic that liquefies by being heated, is filled into the at least one cavity after being liquefied, and is solidified by cooling.

15. The method according to claim 1, wherein an uppermost solidified negative-shape layer and/or an uppermost solidified shaped-object layer is/are cleaned to remove chips that occur during machining material removal.

16. The method according to claim 1, wherein the support part having the base surface is rotated about an axis of rotation during material application and, optionally, during solidification of the first and/or second materials.

* * * * *

UNITED STATES PATENT AND TRADEMARK OFFICE
CERTIFICATE OF CORRECTION

| | |
|---|---|
| PATENT NO. | : 12,042,982 B2 |
| APPLICATION NO. | : 17/267054 |
| DATED | : July 23, 2024 |
| INVENTOR(S) | : Hans Mathea et al. |

It is certified that error appears in the above-identified patent and that said Letters Patent is hereby corrected as shown below:

On the Title Page

Column 1, Applicant, Lines 1-2, delete "dp polar GmbH, Eggenstein-Leopoldshafen (DE)" and insert -- 3D Systems GmbH, Morfelden-Walldorf (DE) --

In the Claims

Column 13, Line 57, Claim 1, delete "layer" and insert -- layer-by-layer --

Column 14, Line 51, Claim 4, delete "in-its" and insert -- in --

Column 16, Line 2, Claim 11, delete "of_the" and insert -- of the --

Column 16, Line 3, Claim 11, delete "material" and insert -- material, --

Signed and Sealed this
First Day of October, 2024

Katherine Kelly Vidal
*Director of the United States Patent and Trademark Office*